United States Patent
Oh et al.

(10) Patent No.: US 11,409,326 B2
(45) Date of Patent: Aug. 9, 2022

(54) MOLD FRAME FOR AN INFORMATION HANDLING SYSTEM

(71) Applicant: Dell Products L.P., Round Rock, TX (US)

(72) Inventors: Guentaek Oh, Singapore (SG); Daehyun Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/022,748

(22) Filed: Sep. 16, 2020

(65) Prior Publication Data

US 2022/0083096 A1 Mar. 17, 2022

(51) Int. Cl.
*G06F 1/16* (2006.01)
*H05K 5/00* (2006.01)
*G02F 1/1333* (2006.01)
*G02F 1/13357* (2006.01)

(52) U.S. Cl.
CPC ...... *G06F 1/1603* (2013.01); *G02F 1/133317* (2021.01); *G02F 1/133605* (2013.01); *G02F 2202/14* (2013.01)

(58) Field of Classification Search
CPC ......... G02F 1/133317; G02F 1/133605; G02F 2202/14; G06F 1/1603
See application file for complete search history.

(56) References Cited

U.S. PATENT DOCUMENTS

2019/0301928 A1* 10/2019 Enomoto .................. G01J 1/50
2020/0218309 A1* 7/2020 Oh ........................ G02F 1/135
2020/0387035 A1* 12/2020 Oh .................... G02F 1/133308

FOREIGN PATENT DOCUMENTS

CN 104267846 A * 1/2015 ........... G06F 1/1601
KR 20180053136 A * 5/2018

* cited by examiner

Primary Examiner — Mariceli Santiago
(74) Attorney, Agent, or Firm — Baker Botts L.L.P.

(57) ABSTRACT

Systems and methods are disclosed for a mold frame for an information handling system that may include an outer portion configured to couple the mold frame to an exterior portion of a cover bottom of the display; a middle portion including an adhesive portion configured to couple the mold frame to a panel of the display; and an inner portion configured to contact an interior portion of the cover bottom, the inner portion including a color-changing material causing the inner portion to change from a first color to a second color, the first color causing the shadow around the display, the second color causing the shadow around the display to minimize.

20 Claims, 6 Drawing Sheets

500

EMIT, BY A LIGHT SOURCE OF A DISPLAY, ONE OR MORE WAVELENGTHS OF LIGHT.
510

RECEIVE, BY A MOLD FRAME OF THE DISPLAY, THE ONE OR MORE WAVELENGTHS OF LIGHT.
520

CAUSE, BY THE ONE OR MORE WAVELENGTHS OF LIGHT, A COLOR-CHANGING MATERIAL TO CHANGE FROM A FIRST COLOR TO A SECOND COLOR.
530

FIG. 5

MOLD FRAME FOR AN INFORMATION HANDLING SYSTEM

BACKGROUND

Field of the Disclosure

The disclosure relates generally to information handling systems, and in particular to a mold frame structure for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed mold frame configured to minimize a shadow around a around a display of an information handling system includes: an outer portion configured to couple the mold frame to an exterior portion of a cover bottom of the display; a middle portion including an adhesive portion configured to couple the mold frame to a panel of the display; and an inner portion configured to contact an interior portion of the cover bottom, the inner portion including a color-changing material causing the inner portion to change from a first color to a second color, the first color causing the shadow around the display, the second color causing the shadow around the display to minimize.

In one or more of the disclosed embodiments, the color-changing material is comprised of a photochromic pigment.

In one or more of the disclosed embodiments, causing the inner portion to change from the first color to the second color includes: absorbing, by the photochromic pigment, one or more wavelengths of light emitted by a light source of the display; and causing, by the photochromic pigment, a photochemical reaction within the mold frame.

In one or more of the disclosed embodiments, the mold frame is within a field of view of a user via the panel of the display.

In one or more of the disclosed embodiments, the mold frame further includes: a reflector coupled to the cover bottom of the display, the reflector including: a covering portion coupled to the inner portion of the mold frame, the covering portion having the second color causing the shadow around the display to minimize; and a folding portion coupling the reflector to the covering portion.

In one or more of the disclosed embodiments, the first color is black.

In one or more of the disclosed embodiments, the second color is grey.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 5 is a flowchart depicting selected elements of an embodiment of a method for minimizing a shadow around a display of an information handling system.

DESCRIPTION OF PARTICULAR EMBODIMENT(S)

Figure 1:
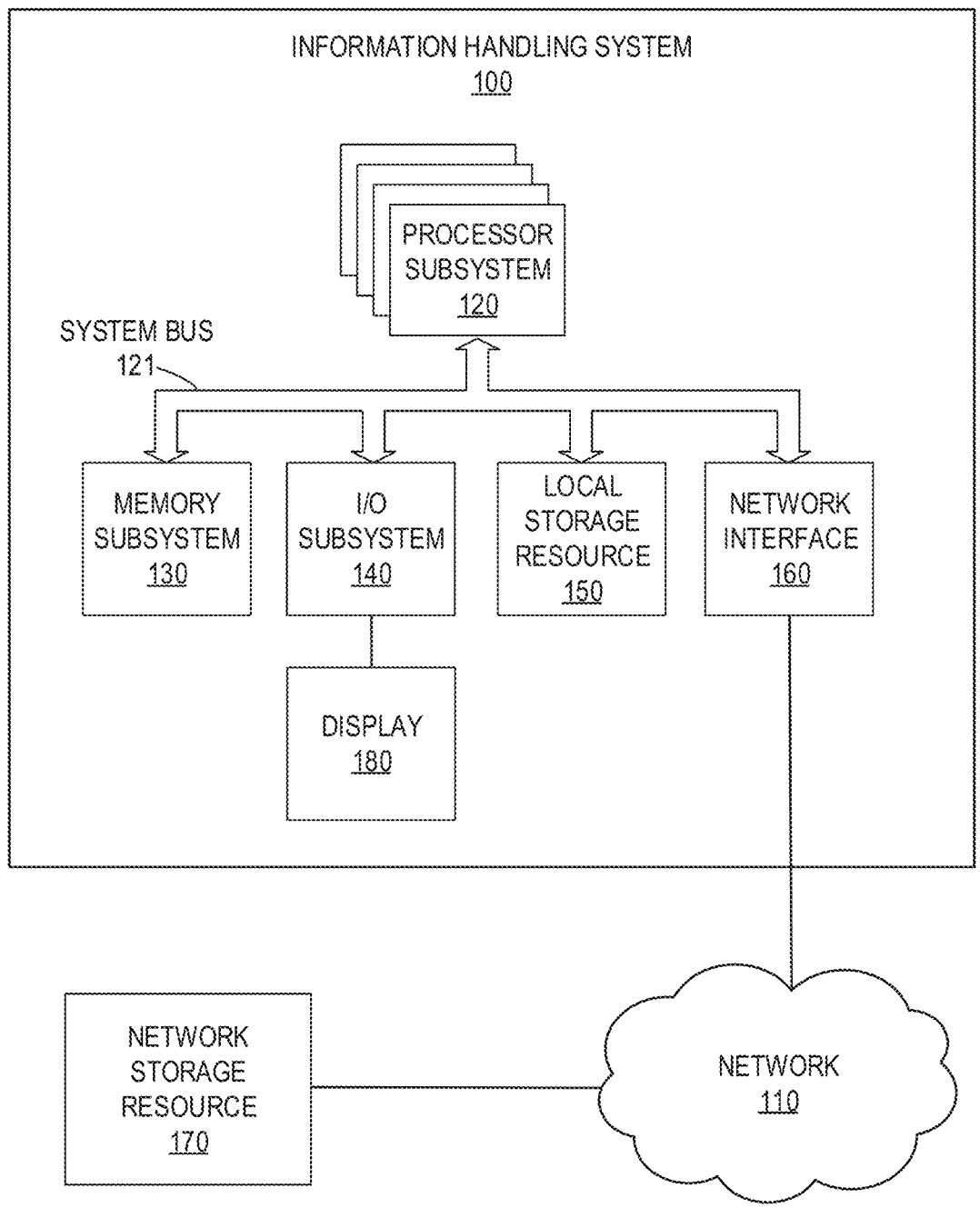
FIG. 1 is a block diagram of selected elements of an embodiment of an information handling system.

This document describes a mold frame for an information handling system that may include an outer portion configured to couple the mold frame to an exterior portion of a cover bottom of the display; a middle portion including an adhesive portion configured to couple the mold frame to a panel of the display; and an inner portion configured to contact an interior portion of the cover bottom, the inner portion including a color-changing material causing the inner portion to change from a first color to a second color, the first color causing the shadow around the display, the second color causing the shadow around the display to minimize.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140 communicatively coupled to a display 180, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In information handling system 100, display 180 may comprise a system, device, or apparatus generally operable to display information processed by information handling system 100. In particular, display 180 may be or include an output device comprised of circuitry configured to display information to a user, a casing to house the circuitry, and a power supply. In one embodiment, display 180 may be or include a liquid crystal display (LCD) with light-emitting diode (LED) backlighting. In other embodiments, display 180 may be or include a cathode ray tube (CRT) monitor, an LED monitor, a plasma display panel monitor, and/or any other type of monitor suitable for displaying information processed by information handling system 100.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2A:
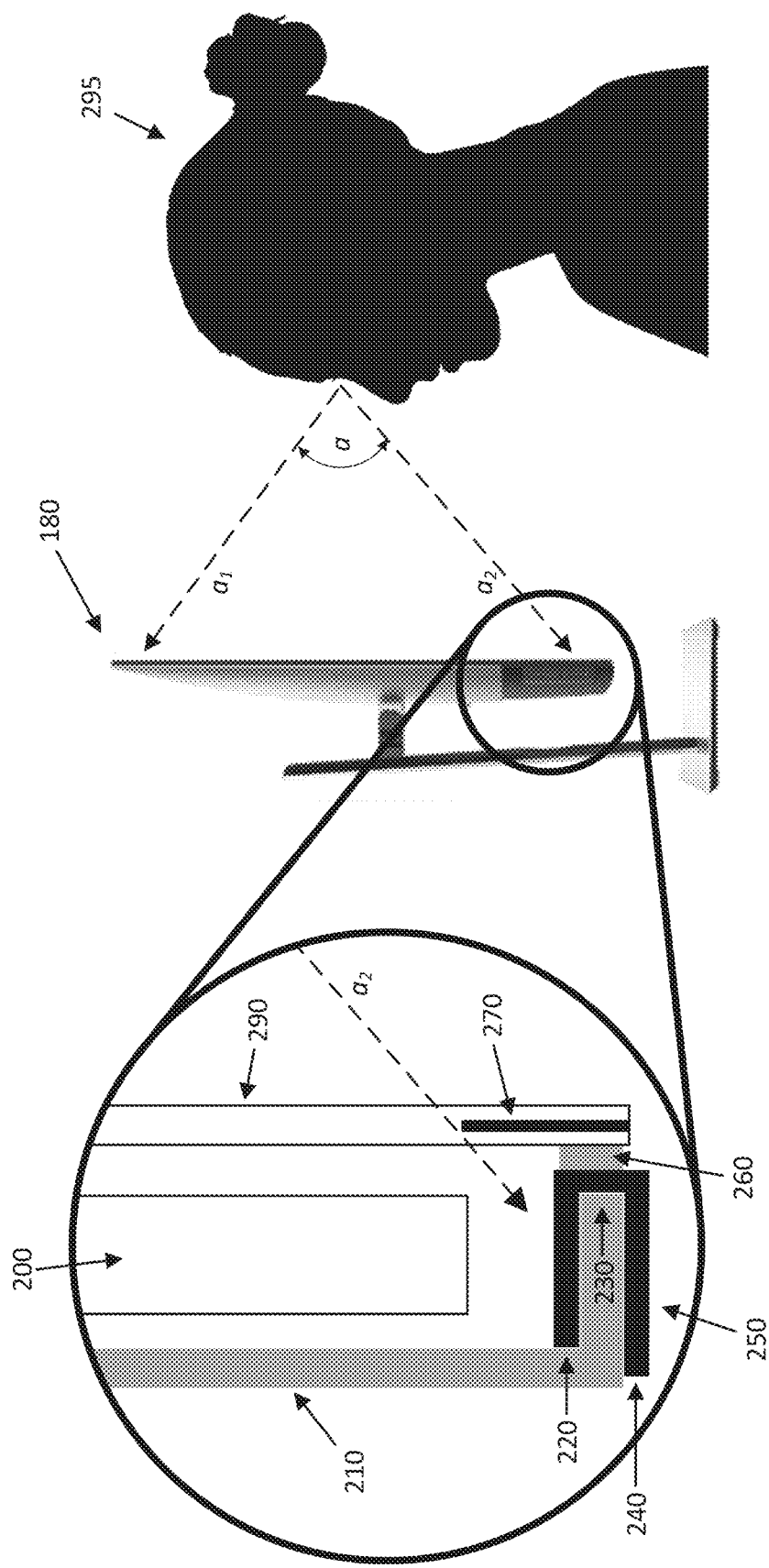
FIG. 2A is a side view of an embodiment of a display of an information handling system in an off state.

FIG. 2A is a side view of an embodiment of a display of an information handling system in an off state. In the embodiment illustrated in FIG. 2A, display 180 includes a light guide plate (LGP) 200, a cover bottom 210, a mold frame 250, an adhesive portion 260, a bezel 270, and a panel 290. Mold frame 250 includes an inner portion 220, a middle portion 230, and an outer portion 240. It is noted that although only a single side (i.e., bottom side) of cover bottom 210, mold frame 250, adhesive portion 260, and bezel 270 is illustrated in FIG. 2A for illustrative purposes, other embodiments of these components may include any number of sides suitable for forming a housing within display 180.

In one embodiment, bezel 270 may be a suitable system, apparatus, or device operable to house and conceal one or more internal components of display 180. In particular, bezel 270 may form an outside frame, or border, around an active viewing area (e.g., a screen) of display 180. Conventionally, bezels may exhibit a width (e.g., 2 inches or more) suitable to both maintain structural integrity of a display and conceal one or more internal components from view of a user. However, the advancement of technical trends has ushered an increasing demand for larger screen size on devices (e.g., display 180), thereby reducing bezel width in favor of increased active viewing area. As such, conventional displays may include narrow bezel, or bezel-less, designs that contribute to larger screen size without necessarily increasing screen dimensions. This decreasing bezel width may inadvertently allow a user to view internal components of a display that were previously concealed by a wider bezel design. Further, certain components (e.g., mold frame 250) may become visible to a user while a display is in use (i.e., in an on state), creating a shadow around the display thereby diminishing overall picture quality and user experience. Specifically, a "shadow effect" may occur in which a noticeable shadow encompasses the active viewing area of the display near the bezel.

In one embodiment, cover bottom 210 may be a suitable system, apparatus, or device operable to support one or more optical components of display 180. In particular, cover bottom 210 may be or include a metal material configured to mount light source 280 (illustrated in FIG. 2B) such that light source 280 may emit light throughout display 180. In addition, cover bottom 210 may be configured to mount mold frame 250, thereby securing one or more optical components within display 180. Specifically, cover bottom 210 may include an exterior portion that includes one or more holes configured to receive mounting pegs (not shown in figure) disposed on interior portions of outer portion 240 of mold frame 250. Cover bottom 210 may additionally include an interior portion configured to contact an inner portion 220 of mold frame 250 when mold frame 250 is mounted to cover bottom 210 (i.e., coupled to the outside portion of cover bottom 210).

In one embodiment, mold frame 250 may be a suitable system, apparatus, or device operable to maintain a gap between one or more optical components of display 180 and panel 290. Specifically, middle portion 230 of mold frame 250 may include an adhesive portion 260 used to maintain a gap between panel 290 and LGP 200 such that panel 290 does not scratch, or otherwise damage, LGP 200. In one embodiment, mold frame 250 may be comprised of an amorphous thermoplastic polymer material capable of being molded into various forms by a manufacturer of information handling system 100 during a manufacturing process. For example, mold frame 250 may be comprised of a polycarbonate plastic that liquifies under temperatures of 270° F. or more to undergo a polycarbonate (PC) injection molding process. This PC injection molding process may yield a mold frame 250 configured to couple with an outside portion of cover bottom 210. In one embodiment, mold frame 250 may include an outer portion 240, a middle portion 230, and an inner portion 220. In other embodiments, mold frame 250 may include additional, fewer, and/or any number of components suitable for maintaining a gap between one or more optical components of display 180 and panel 290.

In one embodiment, outer portion 240 may be configured to couple mold frame 250 to an exterior portion of cover bottom 210. In the example illustrated in FIG. 2A, outer portion 240 may couple with the exterior portion of cover bottom 210. This coupling may encompass the exterior portion on all four sides of cover bottom 210. However, for illustrative purposes only a single side of the coupling between cover bottom 210 and mold frame 250 is shown in FIG. 2A. In one embodiment, outer portion 240 may include one or more mounting pegs (not shown in figure) disposed on interior portions of outer portion 240 configured to couple with one or more holes disposed on the exterior portion of cover bottom 210. In other embodiments, outer portion 240 may include adhesive fasteners, mechanical fasteners, and/or any type of fastener suitable for coupling mold frame 250 to the exterior portion of cover bottom 210.

In one embodiment, middle portion 230 may be configured to maintain a gap between panel 290 and LGP 200 such that panel 290 does not scratch, or otherwise damage, LGP 200. In particular, middle portion 230 may include adhesive portion 260 configured to couple mold frame 250 to panel 290 of display 180. In the example illustrated in FIG. 2A, adhesive portion 260 may be or include a double-sided adhesive material, in which the side of adhesive portion 260 facing toward middle portion 230 is adhesively coupled to middle portion 230 and the side facing toward panel 290 is adhesively coupled to panel 290. Adhesive portion 260 may be configured to have a thickness between middle portion 230 and panel 290 that ensures an adequate distance (e.g., less than 2 mm) between panel 290 and LGP 200, in addition to other optical components of display 180 (not shown in figure). In addition, middle portion 230 may be of a length, spanning between inner portion 220 and outer portion 240, configured to support an adequate surface area (e.g., 2.3 mm) of adhesive portion 260 required to prevent panel 290 from peeling away, or becoming otherwise decoupled, from display 180.

In one embodiment, inner portion 220 may be configured to provide additional stability in the coupling between mold frame 250 and cover bottom 210. Specifically, inner portion 220 may be configured to contact an interior portion of cover bottom 210 when mold frame 250 is mounted to cover bottom 210 (i.e., coupled to the outside portion of cover bottom 210), thereby establishing a hook-like coupling with cover bottom 210. In one embodiment, inner portion 220 may be visible to user 295 of information handling system 100. In particular, bezel 270 may be of a narrow width (e.g., less than 3 mm), allowing a field of view a of user 295 to enter display 180 via panel 290 as illustrated in FIG. 2A. Field of view a of user 295 may span a portion, or an active viewing area, of display 180 while viewing display 180 (e.g., using information handling system 100). In addition, an angle of field of view a may become more or less acute as user 295 moves in relation to display 180. For example, as user 295 becomes closer to display 180, field of view a may widen as respective lines of sight $a_1$ and $a_2$ become more vertical with respect to the active viewing area of display 180. In turn, internal components of display 180 may inadvertently become viewable within lines of sight $a_1$ and $a_2$ of user 295. In the example illustrated in FIG. 2A, line of sight $a_2$ is shown entering display 180 over bezel 270 via panel 290. Here, line of sight $a_2$ is directed toward inner portion 220 of mold frame 250 indicating that inner portion 220 is in direct view of user 295. In one embodiment, this direct view may cause, or otherwise contribute to, a shadow around display 180 while display 180 is in use as described above. Specifically, a shadow encompassing field of view a of user 295 may become noticeable near bezel 270 as inner portion 220 becomes visible by lines of sight $a_1$ and $a_2$, thereby diminishing overall picture quality and user experience. Inner portion 220 is discussed in further detail with respect to FIG. 2B.

In one embodiment, mold frame 250 may include a color-changing material to minimize the shadow around display 180. Specifically, mold frame 250 may include a color-changing material diffused throughout its thermoplastic polymer material. For example, a photochromic pigment may be injected into the liquified polycarbonate during the PC injection molding process described above. In one embodiment, this color-changing material may cause mold frame 250 to change from a first color to a second color in response to receiving one or more wavelengths of light from a light source 280 (illustrated in FIG. 2B) of display 180 while display 180 is in an on state. For example, one or more wavelengths of light emitted from a light-emitting diode (LED) within display 180 may cause the color-changing material to change from black to grey, thereby minimizing the shadow around display 180 as seen by user 295 within field of view a. Here, the first color (e.g., black) may cause the shadow around display 180, and the second color (e.g., grey) may cause the shadow around the display to minimize or become otherwise diminished. In one embodiment, the color-changing material may cause mold frame 250 to change from the second color back to the first color in the absence of one or more wavelengths of light, returning mold frame 250 to its original manufactured appearance. In changing back to the first color, mold frame 250 may be less detectable to user 295 when display 180 is in an off state (as shown in FIG. 2A) as the first color may be darker in shade than the second color. In other embodiments, the color-changing material may cause mold frame 250 to change into any number of colors suitable for minimizing a shadow around display 180. Color-changing material is discussed in further detail with respect to FIG. 2B.

Figure 2B:
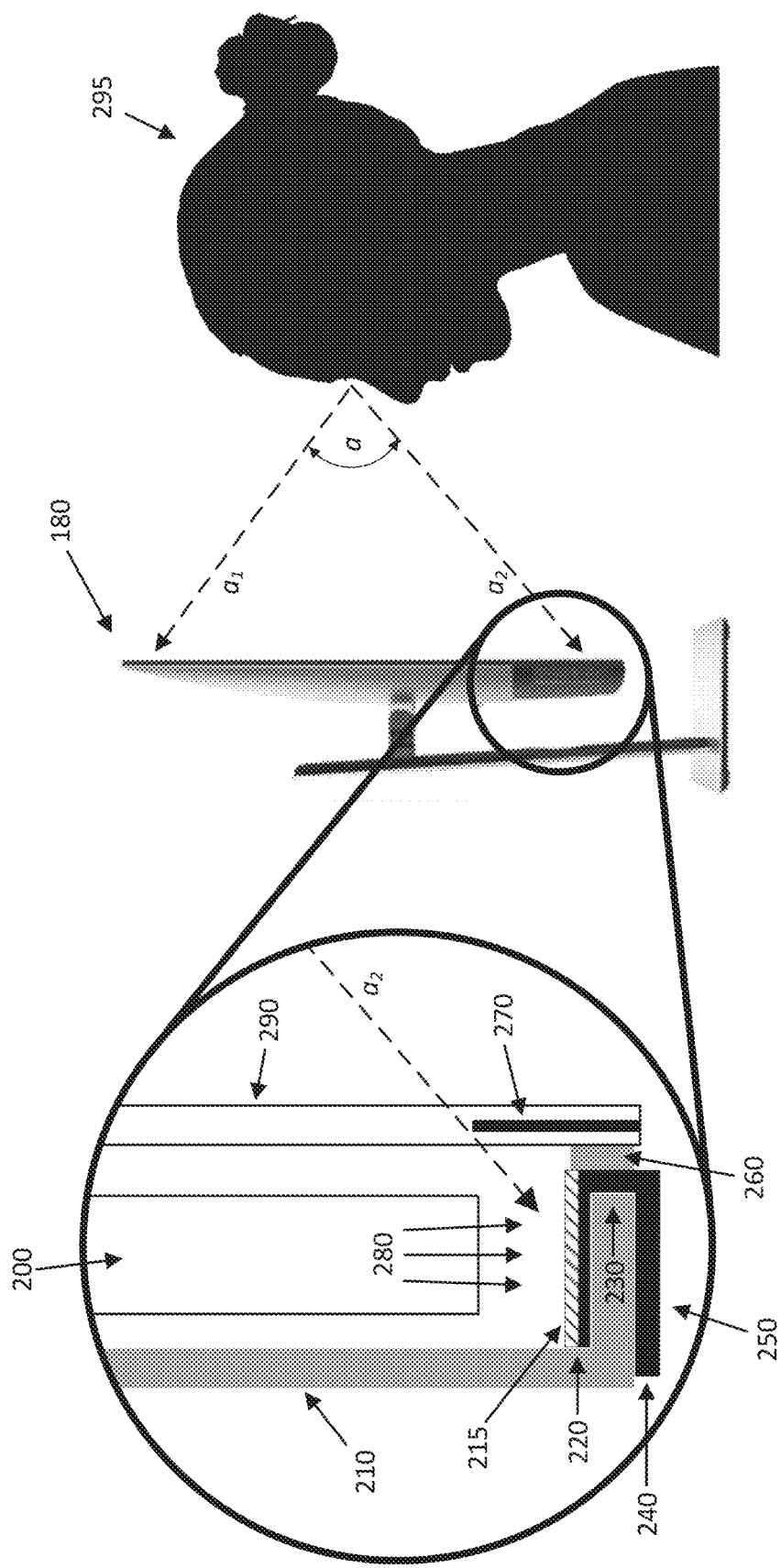
FIG. 2B is a side view of an embodiment of a display of an information handling system in an on state.

FIG. 2B is a side view of an embodiment of a display of an information handling system in an on state. In the embodiment illustrated in FIG. 2B, display 180 includes light guide plate (LGP) 200, cover bottom 210, adhesive portion 260, bezel 270, panel 290, and mold frame 250 as described above with respect to FIG. 2A. However, FIG. 2B further includes an illuminated light source 280 indicating that display 180 is in an on state. Additionally, mold frame 250 further includes a reacting surface 215. It is noted that although only a single side (i.e., bottom side) of cover bottom 210, mold frame 250, adhesive portion 260, and bezel 270 is illustrated in FIG. 2B for illustrative purposes, other embodiments of these components may include any number of sides suitable for forming a housing within display 180.

In the embodiment illustrated in FIG. 2B, light source 280 may be a suitable system, apparatus, or device operable to illuminate display 180. In particular, light source 280 may be or include a semiconductor light source used to supply backlighting to illuminate components of display 180 such that information may be displayed to user 295. For example, light source 280 may emit one or more wavelengths of light into LGP 200 used to distribute the light evenly throughout display 180. In another example, light source 280 may emit one or more wavelengths of light through one or more optical sheets (not shown in figure) of display 180. In the example illustrated in FIG. 2B, light source 280 may emit one or more wavelengths of light toward inner portion 220 of mold frame 250 causing a color-changing material within mold frame 250 to change from a first color to a second color. In one embodiment, light source 280 may comprise one or more LEDs used for an edge-lit display. In another embodiment, light source 280 may provide backlighting for a back-lit display. In other embodiments, light source 280 may be oriented in any manner suitable for illuminating display 180.

In the embodiment illustrated in FIG. 2B, reacting surface 215 comprises a surface of inner portion 220 upon which one or more wavelengths of light may be received by mold frame 250 while display 180 is in an on state. Specifically, the color-changing changing material comprising reacting surface 215 may receive one or more wavelengths of light from light source 280 when light source 280 is in an illuminated state. Here, each of the one or more wavelengths of light may be absorbed by the color-changing material, causing reacting surface 215 to change from a first color to a second color. For example, photochromic pigment infused throughout mold frame 250, and present on reacting surface 215, may absorb the one or more wavelengths of light, causing a photochemical reaction within reacting surface 215. As a result of this photochemical reaction, reacting surface 215 may change from the first color to the second color. Thus, although reacting surface 215 may remain in a user's line of sight (e.g., line of sight $a_2$ illustrated in FIG. 2B), the second color of reacting surface 215 may make inner portion 220 appear less salient within the context of the user's field of view a. That is, the second color of reacting surface 215 may serve to obscure, or otherwise camouflage, inner portion 220 from the field of view a of user 295. This may cause a shadow around display 180 to diminish in appearance, effectively minimizing the shadow to increase picture quality. When display 180 is returned to an off state, light source 280 may return to an unilluminated state causing reacting surface 215 to stop absorbing the one or more wavelengths of light. In this absence of light, reacting surface 215 may undergo an additional photochemical reaction that restores reacting surface 215 to its original manufactured color (e.g., black). That is, in response to display 180 being in an off state, light source 280 may be in an unilluminated state causing the color-changing material within mold frame 250 to change from the second color to the first color shown in FIG. 2A.

Figure 3:
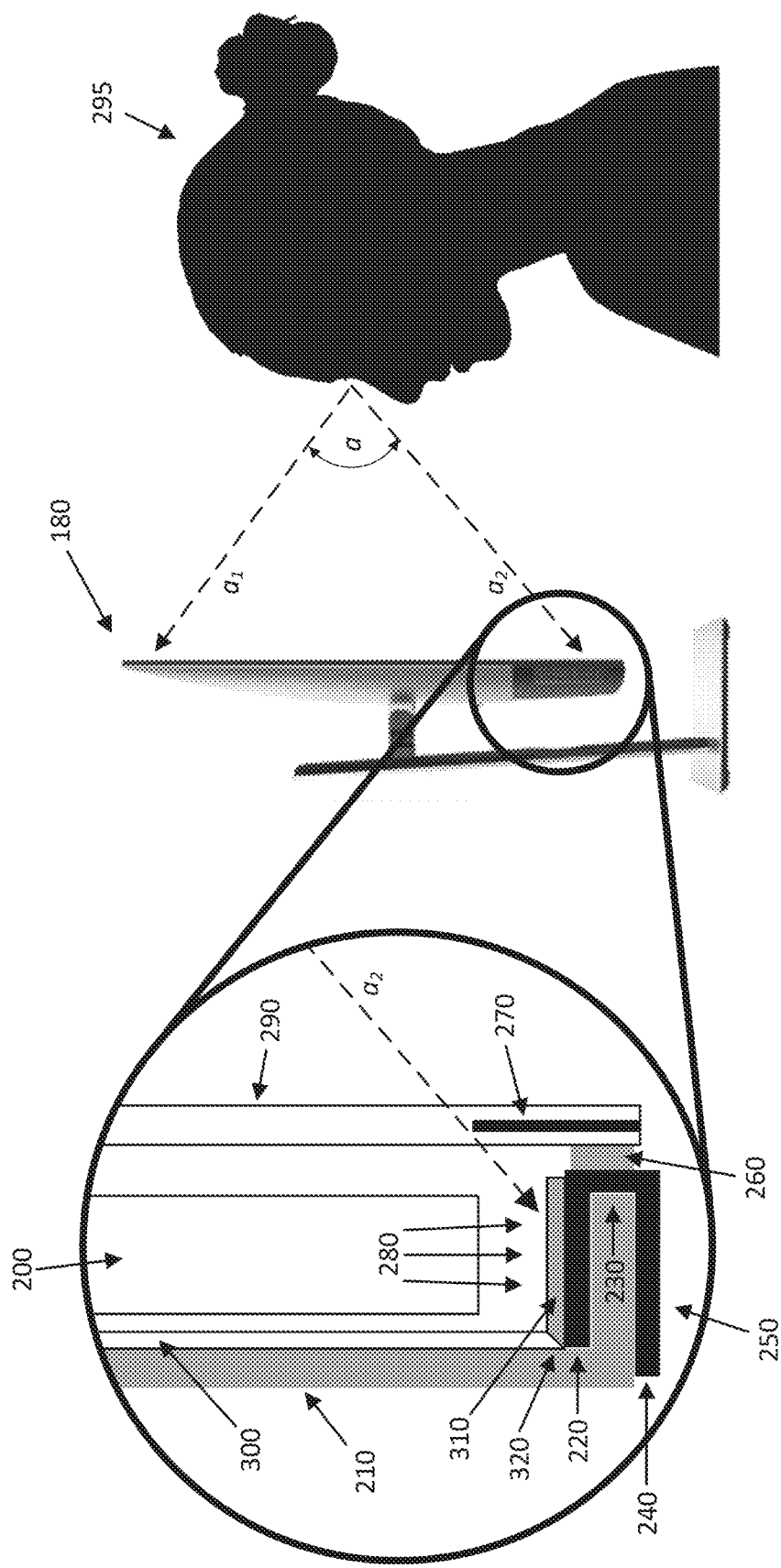
FIG. 3 is a side view of an embodiment of a mold frame and a reflector in a display of an information handling system.

FIG. 3 is a side view of an embodiment of a mold frame and a reflector in a display of an information handling system. In the embodiment illustrated in FIG. 3, display 180 includes light guide plate (LGP) 200, cover bottom 210, adhesive portion 260, bezel 270, panel 290, mold frame 250, and light source 280 as described above with respect to FIGS. 2A and 2B. However, in the embodiment illustrated in FIG. 3, mold frame 250 may not necessarily include color-changing material as described above, and may be or include the first color (e.g., black) causing a shadow to appear around display 180. FIG. 3 additionally includes a reflector 300 coupled to cover bottom 210 to receive light from light source 280 and reflect the light throughout display 180. For example, reflector 300 may reflect light received from light source 280 toward LGP 200 such that the light distributes evenly throughout display 180. In one embodiment, reflector 300 may include one or more covering portions 310 and one or more folding portions 320. It is noted that although only a single side (i.e., bottom side) of cover bottom 210, mold frame 250, adhesive portion 260, bezel 270, and reflector 300 (including covering portion 310 and folding portion 320) is illustrated in FIG. 3 for illustrative purposes, other embodiments of these components may include any number of sides suitable for forming a housing within display 180.

In one embodiment, covering portion 310 may be configured to obscure inner portion 220 from the field of view a of user 295 (e.g., while display 180 is in an on state). Specifically, covering portion 310 may be coupled to a surface of inner portion 220 and may be printed, or otherwise manufactured, to be or include the second color (e.g., grey). As described above with respect to color-changing material, the second color may cause a shadow around display 180 to minimize or become otherwise diminished. Here, covering portion 310 may receive one or more wavelengths of light emitted from light source 280 while preventing the surface of inner portion 220 from receiving the one or more wavelengths of light. That is, covering portion 310 may intercept the one or more wavelengths of light from reaching inner portion 220. Thus, although inner portion 220 may remain in a user's line of sight (e.g., line of sight $a_2$ illustrated in FIG. 3), covering portion 310 may cover inner portion 220 such that inner portion 220 appears less salient within the context of the user's field of view a. Therefore, covering portion 310 effectively prevents a shadow from appearing around display 180.

In one embodiment, folding portion 320 may be configured to bend such that covering portion 310 may couple with a surface of inner portion 220 orthogonal to reflector 300. In particular, folding portion 320 may be or include a half-cut portion coupling reflector 300 to covering portion 310. For example, folding portion 320 may be comprised of a perforated line between reflector 300 and covering portion 310 that allows covering portion 310 to fold at a 90° angle with respect to reflector 300.

Figure 4:
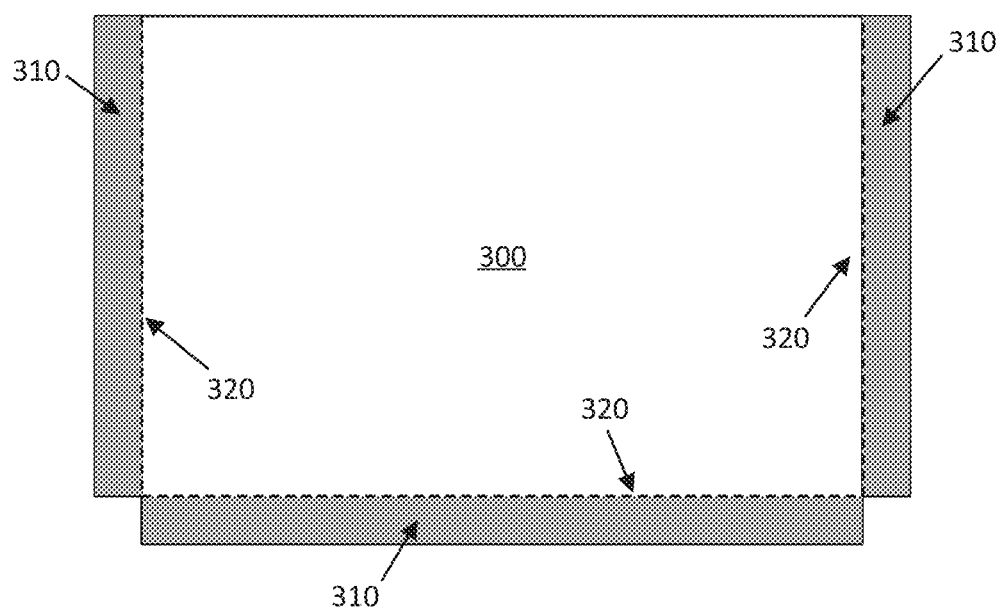
FIG. 4 is a front view of an embodiment of a reflector that includes covering portions and folding portions.

FIG. 4 is a front view of an embodiment of a reflector that includes covering portions and folding portions. In the embodiment illustrated in FIG. 4, reflector 300 may include three covering portions 310 and three folding portions 320 along three sides of reflector 300. Each covering portion 310 and folding portion 320 shown in FIG. 4 may be similar to those described above with respect to FIG. 3. As illustrated in FIG. 4, folding portion 320 may be or include a half-cut portion coupling reflector 300 to covering portion 310. That is, folding portion 320 may be a perforated line between reflector 300 and covering portion 310. Covering portion 310 may be printed, or otherwise manufactured, to be or include the second color causing a shadow around display 180 to minimize or become otherwise diminished. In one embodiment, covering portion 310 may be comprised of the same reflective material as reflector 300. In another embodiment, covering portion 310 and reflector 300 may be comprised of different materials. It is noted that although reflector 300 includes three covering portions 310 and three folding portions 320 in the embodiment illustrated in FIG. 4, other embodiments of reflector 300 may include additional, fewer, and/or any number of covering portions 310 and folding portions 320 suitable for obscuring inner portion 220 from the field of view a of a user 295 (illustrated in FIG. 3).

FIG. 5 is a flowchart depicting selected elements of an embodiment of a method for minimizing a shadow around a display of an information handling system. It is noted that certain operations described in method 500 may be optional or may be rearranged in different embodiments.

Method 500 may begin at step 510, where a light source 280 of display 180 may emit one or more wavelengths of light. For example, the light source 280 may emit one or more wavelengths of light while in an illuminated state as shown in FIG. 2B. In step 520, a mold frame 250 may receive the one or more wavelengths of light emitted by the light source 280. For example, inner portion 220 of mold frame 250 may receive the one or more wavelengths of light as shown in FIG. 2B. Here, mold frame 250 may include a color-changing material. For example, a photochromic pigment may be injected into liquified polycarbonate comprising the mold frame 250 during a PC injection molding process as described with respect to FIG. 2A. In step 530, the one or more wavelengths of light may cause the color-changing material of mold frame 250 to change from a first color to a second color. The first color may cause the shadow around display 180, and the second color may cause the shadow around display 180 to minimize. That is, each of the one or more wavelengths of light may be absorbed by the color-changing material, causing a reacting surface 215 (illustrated in FIG. 2B) to change from a first color to a second color. For example, a photochromic pigment infused throughout mold frame 250 may absorb the one or more wavelengths of light and cause a photochemical reaction. As a result of this photochemical reaction, the color-changing material may change from the first color to the second color. The second color may make inner portion 220 appear less salient within the context of the user's field of view a as shown in FIG. 2B. This may cause a shadow around display 180 to diminish in appearance, effectively minimizing the shadow to increase picture quality.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A mold frame configured to minimize a shadow around a display of an information handling system, the mold frame comprising:
    an outer portion configured to couple the mold frame to an exterior portion of a cover bottom of the display;
    a middle portion including an adhesive portion configured to couple the mold frame to a panel of the display; and
    an inner portion configured to contact an interior portion of the cover bottom, the inner portion including a color-changing material causing the inner portion to change from a first color to a second color, the first color causing the shadow around the display, the second color causing the shadow around the display to minimize.

2. The mold frame of claim 1, wherein the color-changing material is comprised of a photochromic pigment.

3. The mold frame of claim 2, wherein causing the inner portion to change from the first color to the second color comprises:
    absorbing, by the photochromic pigment, one or more wavelengths of light emitted by a light source of the display; and
    causing, by the photochromic pigment, a photochemical reaction within the mold frame.

4. The mold frame of claim 1, wherein the mold frame is within a field of view of a user via the panel of the display.

5. The mold frame of claim 1, wherein the mold frame further comprises:
    a reflector coupled to the cover bottom of the display, the reflector including:
        a covering portion coupled to the inner portion of the mold frame, the covering portion having the second color causing the shadow around the display to minimize; and
        a folding portion coupling the reflector to the covering portion.

6. The mold frame of claim 1, wherein the first color is black.

7. The mold frame of claim 1, wherein the second color is grey.

8. A method for minimizing a shadow around a display of an information handling system, the method comprising:
    in response to the display being in an on state:
        emitting, by a light source of the display, one or more wavelengths of light, the light source in an illuminated state;
        receiving, by a mold frame of the display, the one or more wavelengths of light emitted by the light source, the mold frame including a color-changing material; and
        causing, by the one or more wavelengths of light, the color-changing material to change from a first color to a second color, the first color causing the shadow around the display, the second color causing the shadow around the display to minimize.

9. The method of claim 8, further comprising:
    in response to the display being in an off state:
        causing, by the light source, the color-changing material to change from the second color to the first color, the light source in an unilluminated state.

10. The method of claim 8, wherein the color-changing material is comprised of a photochromic pigment.

11. The method of claim 10, wherein causing the color-changing material to change from the first color to the second color comprises:
    absorbing, by the photochromic pigment, the one or more wavelengths of light; and
    causing, by the photochromic pigment, a photochemical reaction within the mold frame.

12. The method of claim 8, wherein the first color is black.

13. The method of claim 8, wherein the second color is grey.

14. An information handling system, comprising:
    at least one processor; and
    a display including:
        a light source; and
        a mold frame configured to minimize a shadow around the display, the mold frame comprising:
            an outer portion configured to couple the mold frame to an exterior portion of a cover bottom of the display;
            a middle portion including an adhesive portion configured to couple the mold frame to a panel of the display; and
            an inner portion configured to contact an interior portion of the cover bottom, the inner portion including a color-changing material causing the inner portion to change from a first color to a second color, the first color causing the shadow around the display, the second color causing the shadow around the display to minimize.

15. The information handling system of claim 14, wherein the color-changing material is comprised of a photochromic pigment.

16. The information handling system of claim 15, wherein causing the inner portion to change from the first color to the second color comprises:
- absorbing, by the photochromic pigment, one or more wavelengths of light emitted by the light source of the display; and
- causing, by the photochromic pigment, a photochemical reaction within the mold frame.

17. The information handling system of claim 14, wherein the mold frame is within a field of view of a user via the panel of the display.

18. The information handling system of claim 14, wherein the mold frame further comprises:
- a reflector coupled to the cover bottom of the display, the reflector including:
  - a covering portion coupled to the inner portion of the mold frame, the covering portion having the second color causing the shadow around the display to minimize; and
  - a folding portion coupling the reflector to the covering portion.

19. The information handling system of claim 14, wherein the first color is black.

20. The information handling system of claim 14, wherein the second color is grey.

* * * * *